Aug. 12, 1930.  F. J. PARDINI  1,772,518
IRRIGATION WEIR
Filed March 27, 1928   2 Sheets-Sheet 1
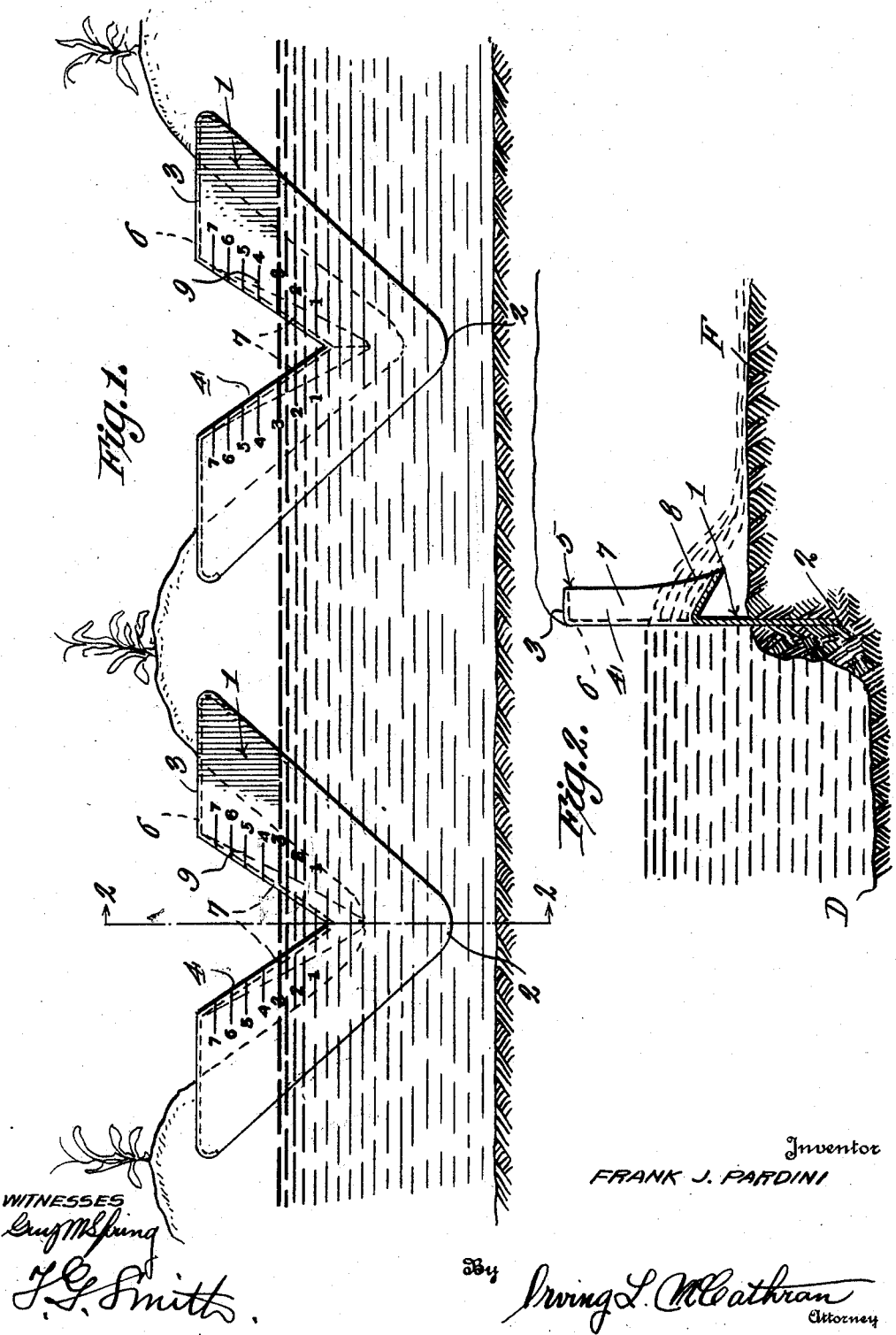
Inventor
FRANK J. PARDINI
WITNESSES
By Irving L. McCathran
Attorney Aug. 12, 1930.  F. J. PARDINI  1,772,518
IRRIGATION WEIR
Filed March 27, 1928  2 Sheets-Sheet 2
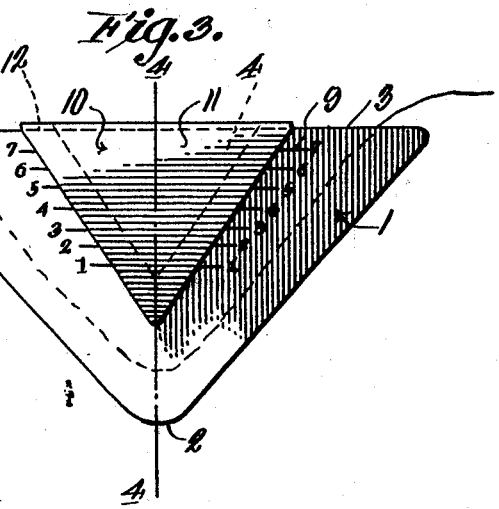
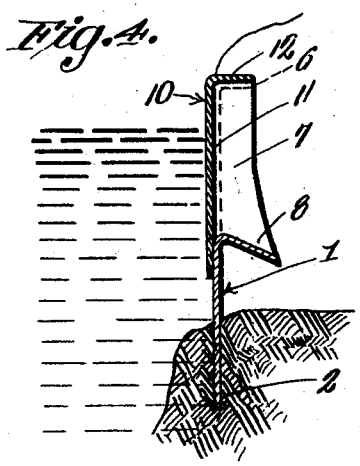
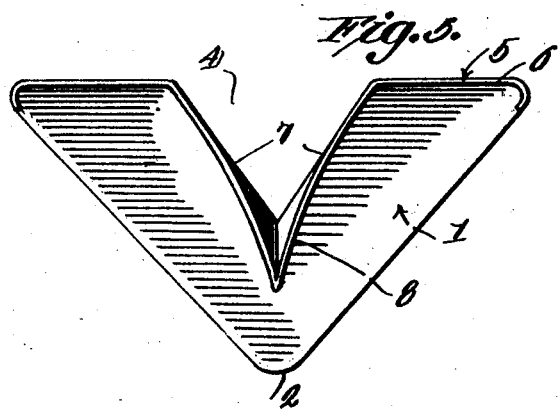
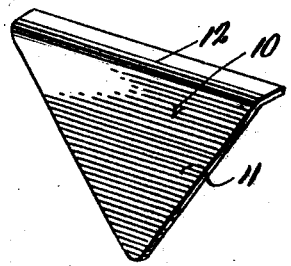
Inventor
FRANK J. PARDINI Patented Aug. 12, 1930

1,772,518

UNITED STATES PATENT OFFICE

FRANK J. PARDINI, OF RENO, NEVADA

IRRIGATION WEIR

Application filed March 27, 1928. Serial No. 265,084.

This invention relates to improvements in irrigating weirs and has as its general object to provide a weir capable of ready installation in the ends of furrows in a field of growing plants to be irrigated, at the juncture of the furrows with the irrigating ditch for the purpose of maintaining a flow of water from the ditch to the furrows at a uniform rate of current flow. I am aware of the fact that attempts have been heretofore made to provide for supply of water to furrows from an irrigating ditch, at a uniform rate of current flow, by the use of pipes leading from the ditch and arranged to discharge into the furrows, but it is a well known fact that such pipes soon become clogged with silt or other foreign matter with the result that the walls of the irrigating ditch become damaged due to the abnormal accumulation of water therein through the inability of the water to escape through the clogged pipes. Therefore the present invention contemplates the provision of a weir so constructed that it cannot become clogged and will at all times insure of flow of water from the irrigating ditch to the furrows at a uniform rate of current flow, thus avoiding damage to the walls of the ditch.

Another object of the invention is to provide a weir so constructed that it may be readily embedded in the soil at the juncture of the furrows with the irrigating ditch and the relative positions of the entire number of weirs readily determined, so that all of the weirs may be positioned at the same elevation with respect to the water level in the irrigating ditch to insure of uniform current flow of the water from the ditch into the furrows.

The invention contemplates the provision of a weir so constructed that it may be readily forced downwardly into the soil forming the bed of the irrigation ditch and the furrow and the establishment of one of the weirs at that end of each of the furrows in the field, which communicates with the irrigating ditch, the weirs being so constructed as to provide for the flow of water past the same from the ditch and into the respective furrow at different rates of current flow depending upon the depth to which the weir is embedded in the soil or, more specifically, the elevation of the weir with respect to the water level in the irrigating ditch, and the invention has a further object to provide means whereby the weirs may be quickly and conveniently placed in position and all of the weirs accurately adjusted to occupy the same elevation so that, regardless of the variations in depth of the different furrows, there will be precisely the same rate of current flow of water from the irrigating ditch into all of the furrows thus insuring of an even irrigation of the entire field and enhance the growth of the crops growing in the field.

Another object of the invention is to provide a weir, for the purpose stated, so constructed that there will be no tendency for the water in the furrows dislodging the weir in the event of a back flow of the water.

Another object of the invention is to provide a weir so constructed that when a number of the same are positioned at the points of communication of the furrows with the irrigating ditch, all of the weirs may be quickly installed at the same elevation with respect to the water level in the ditch and at a greater or less elevation so as to correspondingly vary the volume of water delivered into all of the furrows, the invention therefore contemplating a regulation of the weirs in accordance with the character of the soil, it being well known that some soils require a greater supply of water than others and that the best results may be obtained, in the growing of the crops, if precisely the necessary amount of water is supplied.

Another object of the invention is to provide, in a weir of the class described, novel means whereby the flow of water past the weir from the irrigation ditch to the furrows, may be cut off, whenever desired, by the mere temporary assemblage, with each weir, of a water gate which will be held in place upon the weir solely by the pressure of the water thereagainst thereby obviating the necessity of employing mechanical means for securing the gate in place and permitting of its more readily installation and removal as occasion may require.

While the accompanying drawings and the description which is to follow, constitute a disclosure of the preferred embodiment of the invention, it will be understood that various changes may be made within the scope of what is claimed.

In the accompanying drawings:

Figure 1 is a view illustrating two of the weirs embodying the invention, in elevation, and installed in an irrigation ditch at the receiving ends of the furrows to be irrigated;

Figure 2 is a vertical sectional view taken substantially on the line 2—2 of Figure 1 looking in the direction indicated by the arrows;

Figure 3 is a view in front elevation of one of the weirs, the view also illustrating the cut-off gate of the weir assembled therewith;

Figure 4 is a vertical sectional view taken substantially on the line 4—4 of Figure 3 and similar to Figure 2 illustrating the gate in place;

Figure 5 is a rear elevation of the weir;

Figure 6 is a perspective view of the cut-off gate.

The weir, embodying the invention, comprises a substantially V-shaped body 1 which is preferably of heavy sheet metal, the body, by reason of its peculiar form, having a narrow entering lower end 2 and a relatively wide upper end 3, the peculiar marginal contour of the body providing a V-shaped water conducting recess in the body opening through the top thereof and located midway between the downwardly diverging lateral edges of the body. In order to reinforce the body and likewise render its installation and removal more convenient and also to provide against displacement of the body from its position in the bed of the irrigating ditch and the communicating ends of the furrows, a flange 5 is formed to extend along the upper edges of the side portions of the body and along the downwardly converging inner edges of said side portions, the first mentioned portions of the flanges being indicated by the numeral 6, and the last mentioned portions by the numeral 7, and preferably the portions 7 of the flange will be of gradually increasing width from a point near the bottom of the recess 4 to the meeting lower ends of the flanges and likewise it is preferable that the flanges be deflected along curved lines throughout their lower portions as indicated by the numeral 8 so that, at their lower portions and their juncture, the flanges form a substantially downwardly directed spout through which the water may flow from the irrigation ditch, which is indicated by the reference letter D, into the furrows which are indicated by the reference letter F, as most clearly shown in Figure 2 of the drawings.

As will be evident, by reference to Figures 2 and 4 of the drawings, the lower portion of the body of the weir is to be forced downwardly into the soil comprising the bed of the irrigation ditch and the bottoms of the furrows, at the points of juncture of the intake ends of the furrows with said ditch, and in order that the depth to which each of the weirs is forced into the soil, may be readily ascertained by the one positioning the weirs in place, counterpart scales 9 are provided upon that face of the body of the weir which is presented to the irrigation ditch and along opposite sides of the opening 4, and as will be observed by reference to Figure 1 of the drawings, the invention contemplates embedding the said lower portions of the weir bodies in the soil in such manner that corresponding scale marks on all of the weirs will register with the water level in the irrigation ditch. It will be observed, by reference to Figure 1, which figure is intended to illustrate the advantages presented by the weir embodying the invention, that the left hand furrow is of less depth than the right hand furrow but that the weirs are both submerged in the water in the irrigation ditch to precisely the same depth, the water level, in each instance, registering with the scale mark bearing the index "3", in each instance. Therefore, notwithstanding the difference in depth of the furrows, precisely the same volume of water will flow past each of the weirs, through the recess 4, and into the respective furrow and therefore there will be, through a corresponding arrangement of all of the weirs, a corresponding rate of current flow of the water into each furrow. It will also be evident from an inspection of Figure 1 and from the foregoing description that the weirs of the entire series employed in the irrigation of a field, may all be readily adjusted to the same elevation with respect to the water level in the irrigation ditch and therefore a greater or less current flow of water may be admitted to the furrows in accordance with differences in the condition or character of the soil. Therefore the weir, embodying the invention, is designed to be placed upon the market and sold in various localities where the soil conditions vary widely.

In order that the flow of water through the weirs and from the irrigation ditch into the furrows may be cut off, whenever desired or found necessary, a gate such as shown in Figures 3, 4 and 6 of the drawings and indicated in general by the numeral 10, is provided in connection with each of the weirs. Each of these gates comprises a triangular or V-shaped body 11 of sheet metal which is of sufficient width and height to completely cover the V-shaped recess 4 in the body of the respective weir, when the plate 11 is disposed against that face of the weir which is presented to the irrigation channel, and the plate 11 of each gate is formed along its upper edge with a right angularly projecting flange 12 which is designed to rest flat upon the portions 6 of the flange 5 when the plate is arranged in place upon the weir as illustrated in Figures 3 and 4 of the drawings. At this point it will be evident that the gates 10 are held in proper position upon the respective weirs through the water pressure in the irrigation ditch, this pressure being sufficient to hold the gates in place without the necessity of employing any extraneous fastening means. Therefore, in the use of the invention, it will be a simple matter to arrange the gates of all of the weirs in place and an equally simple matter to remove the same when it is desired to resume irrigation.

It will be evident that due to the provision of the flange extending along the upper edge of the body of the weir, the weir may be more conveniently embedded in the soil and removed therefrom, the flange, in the first instance, constituting a relatively broad surface against which pressure may be exerted in a downward direction to cause the tapered lower end of the body to enter the soil, and, in the latter instance, constituting a portion which may be grasped for the purpose of either adjustably elevating or completely extracting the weir.

Having thus described the invention, what I claim is:

A weir of the class described comprising a flat substantially V-shaped body having a substantially V-shaped opening formed in the top thereof, and graduations formed upon the outer face of the body to permit a series of weirs to be inserted in a series of irrigation ditches at a uniform height.

In testimony whereof I affix my signature.

FRANK J. PARDINI.